United States Patent
Hashimoto et al.

(10) Patent No.: US 9,887,660 B2
(45) Date of Patent: Feb. 6, 2018

(54) MOTOR CONTROL DEVICE EQUIPPED WITH TORQUE COMMAND LIMITING FUNCTION AT POWER OUTAGE

(71) Applicant: FANUC CORPORATION, Yamanashi (JP)

(72) Inventors: Shoutarou Hashimoto, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 14/803,307

(22) Filed: Jul. 20, 2015

(65) Prior Publication Data
US 2016/0028331 A1  Jan. 28, 2016

(30) Foreign Application Priority Data

Jul. 24, 2014  (JP) ................. 2014-151047

(51) Int. Cl.
| | | |
|---|---|---|
| G02B 5/00 | (2006.01) | |
| H02H 7/08 | (2006.01) | |
| H02P 1/04 | (2006.01) | |
| H02P 3/00 | (2006.01) | |
| H02P 29/024 | (2016.01) | |
| H02P 3/14 | (2006.01) | |
| H02P 3/18 | (2006.01) | |

(52) U.S. Cl.
CPC .............. *H02P 29/025* (2013.01); *H02P 3/14* (2013.01); *H02P 3/18* (2013.01)

(58) Field of Classification Search
CPC .. H02P 29/025; H02P 3/14; H02P 3/18; H02P 6/18; B23Q 11/0089
USPC ................................... 318/479, 375
See application file for complete search history.

(56) References Cited

U.S. PATENT DOCUMENTS 6,362,585 B1 * 3/2002 Hiti ..................... B60L 11/1803
  318/430
7,459,874 B2 * 12/2008 Bae ..................... B60L 11/1861
  318/609

(Continued)

FOREIGN PATENT DOCUMENTS

JP  7143780 A  6/1995

OTHER PUBLICATIONS

English Machine Translation for Japanese Publication No. 7-143780, published Jun. 2, 1995, 13 pgs.

*Primary Examiner* — Erick Glass
(74) *Attorney, Agent, or Firm* — Fredrikson & Byron, P.A.

(57) ABSTRACT

A motor control device of the present invention is a control device for a motor for driving a feed shaft of a machine tool, and includes: a power outage detector for detecting a power outage of a power source for supplying power to drive the motor; a forcible decelerator for forcibly decelerating the motor in response to a torque command when a power outage is detected; a DC link voltage monitor for monitoring a DC link voltage applied to an amplifier for driving the motor; a determination unit for determining whether the value of the DC link voltage is greater than a first threshold, or whether the change ratio of the DC link voltage is greater than a second threshold; and, a torque command limiter for limiting the torque command to a predetermined torque command limiting value, in accordance with the result of determination at the determination unit.

8 Claims, 9 Drawing Sheets

(56) References Cited

U.S. PATENT DOCUMENTS

| | | | | |
|---|---|---|---|---|
| 8,803,458 B2* | 8/2014 | Horikoshi | ............... | H02P 3/22 |
| | | | | 318/400.01 |
| 9,092,027 B2* | 7/2015 | Okita | ............... | G05B 19/4062 |
| 2005/0077853 A1* | 4/2005 | Nagakura | ............... | H02M 7/48 |
| | | | | 318/432 |
| 2012/0323430 A1* | 12/2012 | Nakamura | ............... | B60L 11/1803 |
| | | | | 701/22 |
| 2013/0015790 A1* | 1/2013 | Kermarrec | ............... | H02P 21/36 |
| | | | | 318/364 |
| 2014/0125264 A1* | 5/2014 | Nakamura | ............... | H02P 6/10 |
| | | | | 318/400.23 |

* cited by examiner

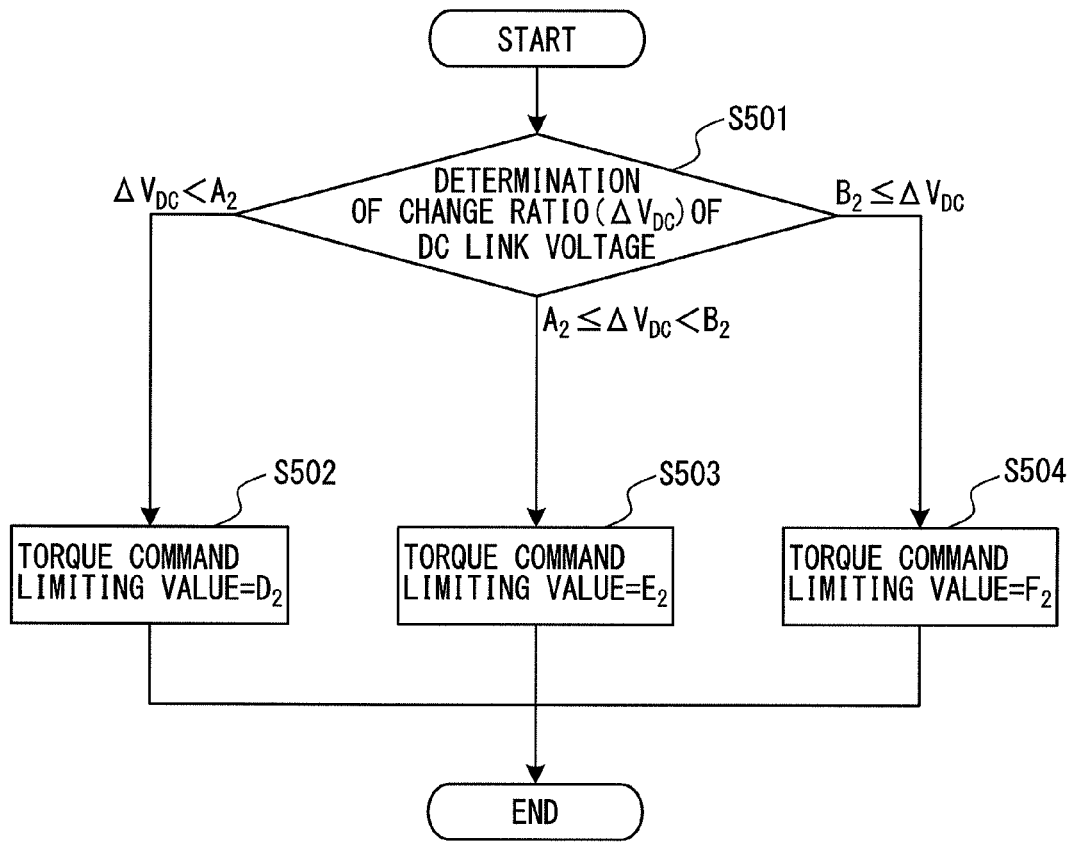
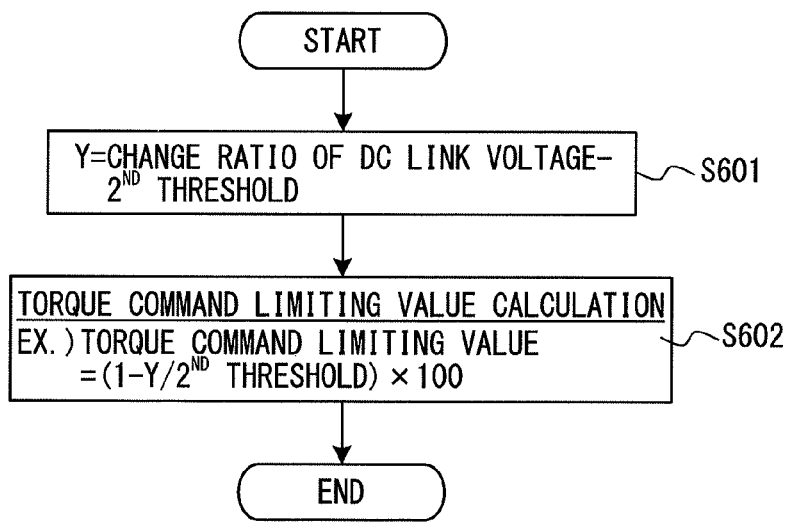

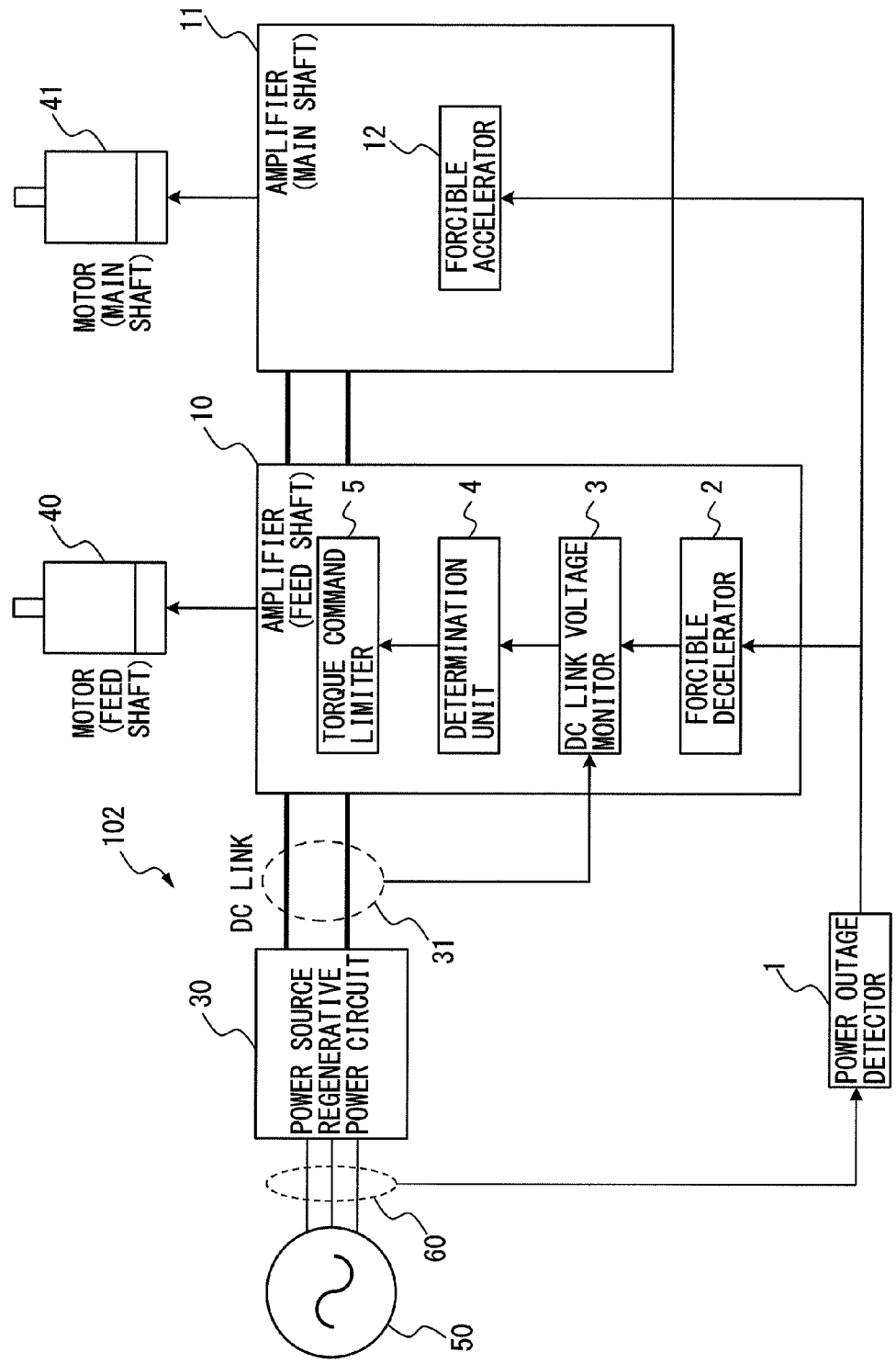

MOTOR CONTROL DEVICE EQUIPPED WITH TORQUE COMMAND LIMITING FUNCTION AT POWER OUTAGE

CROSS-REFERENCE TO RELATED APPLICATIONS

This application is a new U.S. patent application that claims benefit of JP 2014-151047, filed on Jul. 24, 2014, the entire content of JP 2014-151047 is hereby incorporated by reference.

FIELD OF THE INVENTION

The present invention relates to a motor control device, in particular relating to a motor control device for decelerating a motor for driving the feed shaft by limiting the torque of the motor at the time of a power outage.

BACKGROUND OF THE INVENTION

When the power source for supplying power to drive a motor has stopped, it is necessary to urgently stop the motor for driving the feed shaft in a machine tool and the like. In such a case, in order to stop the motor in an emergency, there has been a known method whereby the speed command to be given to the motor control device is set to be zero so as to forcibly decelerate the motor at full torque (for example, Japanese Patent Application Laid-open H07-143780 (JP 7-143780 A).

However, there occur cases where regenerative energy from the motor for driving the feed shaft becomes excessive. When the regenerative energy becomes excessive in this way, use of the above conventional technology will cause the DC link voltage applied to the amplifier to rise due to the regenerative energy from the motor, hence the amplifier side will experience an overvoltage state. As a result, an overvoltage alarm arises and control of the motor may no longer be possible.

When an overvoltage alarm has arisen and control of the motor stops in the above way, the motor being in the course of deceleration starts to be decelerated by dynamic braking. Deceleration by dynamic braking will take a long time for deceleration. Therefore, the stopping distance of the feed shaft becomes longer, possibly giving rise to a problem that collision and damage take place in the machine in some cases. Herein, dynamic braking refers to a braking function of quickly stopping the motor by thermally consuming the rotational energy by forming a short-circuit between the terminals of the servo motor by way of a resistor.

The present invention is to provide a motor control device that can quickly stop a motor for driving a feed shaft by avoiding the occurrence of an excessive voltage alarm after a power outage.

SUMMARY OF THE INVENTION

A motor control device according to one embodiment of the present invention is a control device for a motor for driving a feed shaft of a machine tool, and includes: a power outage detector for detecting a power outage of a power source for supplying power to drive the motor; a forcible decelerator for forcibly decelerating the motor in response to a torque command at the time when a power outage is detected; a DC link voltage monitor for monitoring the DC link voltage applied to an amplifier for driving the motor; a determination unit for determining whether or not the value of the DC link voltage is greater than a first threshold, or whether or not the change ratio of the DC link voltage is greater than a second threshold; and, a torque command limiter for limiting the torque command to a predetermined torque command limiting value, in accordance with the result of determination at the determination unit.

DESCRIPTION OF THE DRAWINGS

These and other features and advantages of the present invention will be better understood by reading the following detailed description, taken together with the drawings wherein:

FIG. 9 is a flow chart for illustrating an operation sequence of a motor control device according to a fifth embodiment of the present invention;

FIG. 10 is a flow chart for illustrating an operation sequence of a motor control device according to a sixth embodiment of the present invention; and, FIG. 11 is a configurational diagram showing a motor control device according to a seventh embodiment of the present invention.

DETAILED DESCRIPTION OF THE PREFERRED EMBODIMENT

Figure 1:
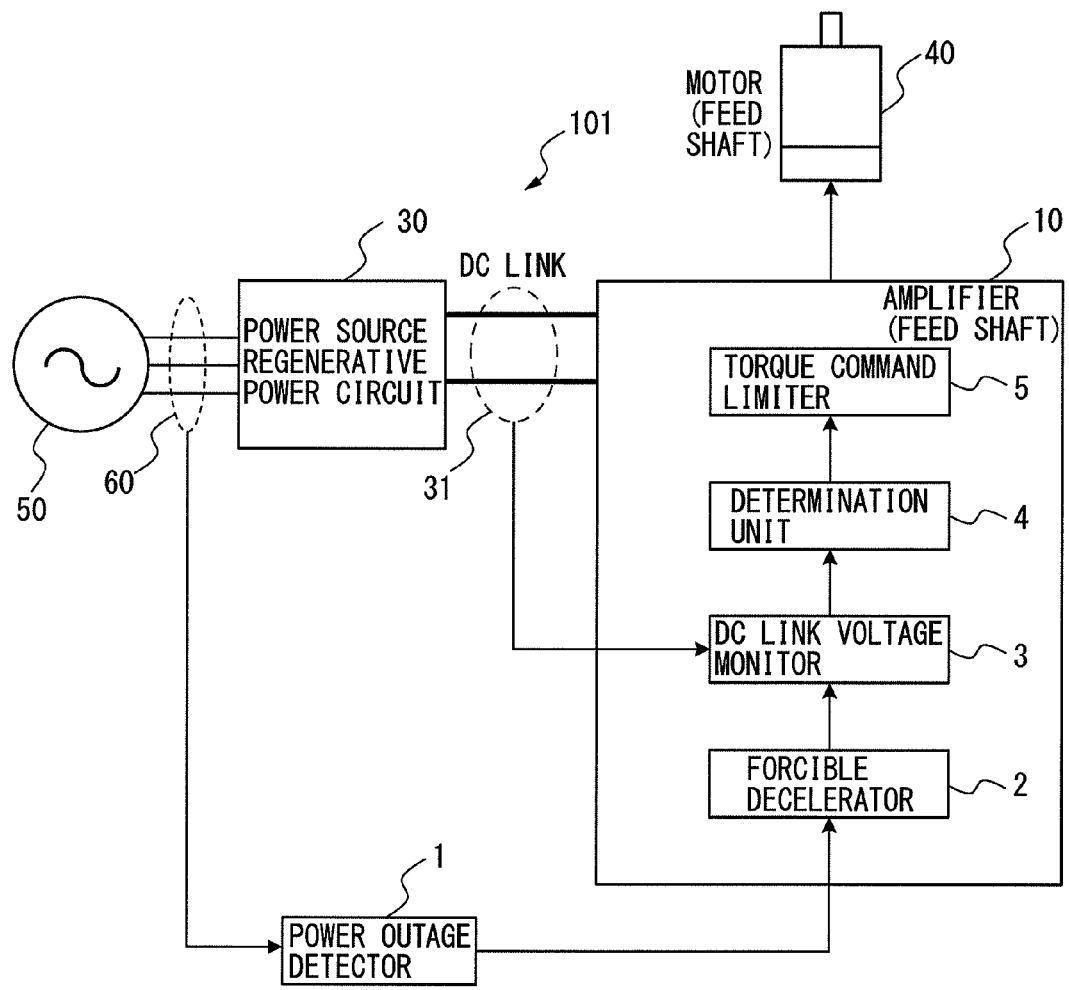
FIG. 1 is a configurational diagram showing a motor control device according to a first embodiment of the present invention.

Referring to the drawings, motor control devices according to the present invention will be described. However, it should be noted that the technical scope of the present invention is not limited by the embodied mode of these but embraces the inventions defined by the claims and their equivalence.

First Embodiment

A motor control device according to the first embodiment of the present invention will be described with reference to the drawings. FIG. 1 is a configurational diagram showing a motor control device according to the first embodiment of the present invention. A motor control device 101 according to the first embodiment of the present invention is a control device of a motor 40 for driving the feed shaft of a machine tool, and includes: a power outage detector 1 for detecting a power outage of a power source 50 for supplying power to drive the motor; a forcible decelerator 2 for forcibly decelerating the motor 40 in response to a torque command at the time when a power outage is detected; a DC link voltage monitor 3 for monitoring the DC link voltage applied to an amplifier 10 for driving the motor 40; a determination unit 4 for determining whether or not the value of DC link voltage is greater than a first threshold, or whether or not the change ratio of the DC link voltage is greater than a second threshold; and, a torque command limiter 5 for limiting the torque command to a predetermined torque command limiting value, in accordance with the result of determination at the determination unit 4.

As the power source 50, a three-phase alternative current (AC) power source may be used, for example. The power source 50 supplies AC power to a power source regenerative power circuit 30. The wiring between the power source 50 and the power source regenerative power circuit 30 is provided with a current detector 60 for detecting the current flowing from the power source 50 to the power source regenerative power circuit 30, and the result of detection is sent to the power outage detector 1. The power outage detector 1, based on the result of detection from the current detector 60, detects a power outage of the power source 50 for supplying power to the drive the motor 40.

When the power outage detector 1 detects a power outage of the power source 50, a power outage detection signal indicating detection of a power outage is sent to the forcible decelerator 2. The forcible decelerator 2, based on the power outage detection signal, forcibly decelerates the motor 40 in response to the torque command at the time of power outage detection.

The power source regenerative power circuit 30 converts AC voltage input from the power source 50 into direct current (DC) voltage, produces smoothed DC voltage through a DC link capacitor (not shown) and returns regenerative energy from the motor 40 to the power source 50. The value of the DC link voltage applied to the amplifier 10 is detected by the voltage detector 31 and transmitted to the DC link voltage monitor 3 built in the amplifier 10. The DC link voltage monitor 3 monitors the DC link voltage applied to the amplifier 10.

The data of DC link voltage obtained at the DC link voltage monitor 3 is transmitted to the determination unit 4. The determination unit 4, based on the obtained data of DC link voltage, determines whether or not the value of DC link voltage is greater than a first threshold, or whether or not the change ratio of DC link voltage is greater than a second threshold.

The result of determination by the determination unit 4 is sent to the torque command limiter 5. The torque command limiter 5 limits the torque command to a predetermined torque command limiting value, in accordance with the result of determination at determination unit 4. Herein, the lower limit of the torque command limiting value may be set to be equal to or greater than the torque applied when the motor is decelerated by dynamic breaking. The amplifier 10 controls the motor 40 based on the torque command limited to the predetermined torque command limiting value.

Figure 2:
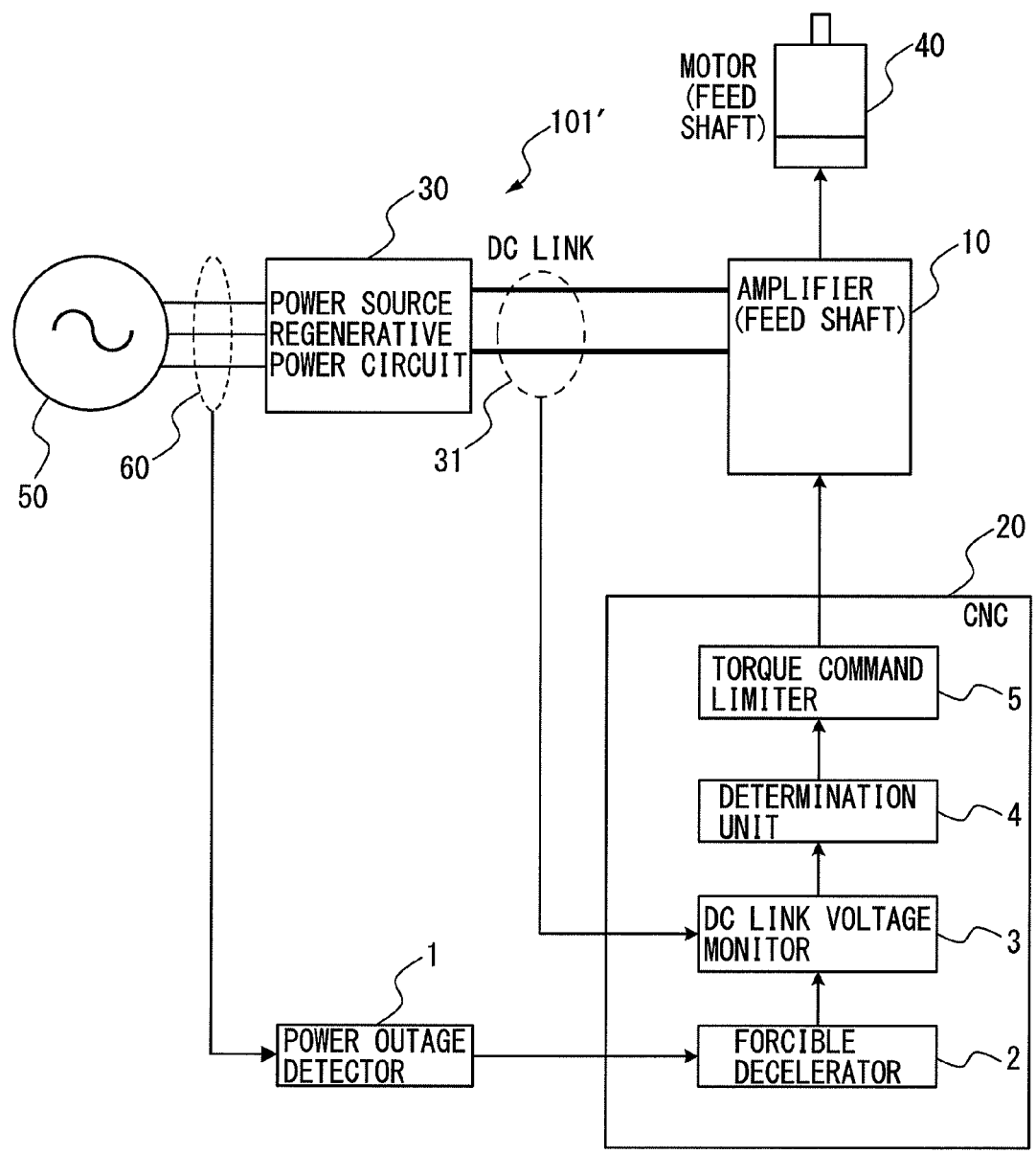
FIG. 2 is a configurational diagram showing a motor control device according to another embodied mode of the first embodiment of the present invention.

In the motor control device 101 according to the first embodiment shown in FIG. 1, the forcible decelerator 2, the DC link voltage monitor 3, the determination unit 4 and torque command limiter 5 are built in the amplifier 10. However, the present invention should not be limited to this example. For instance, as in a motor control device 101' according to another embodied mode of the first embodiment of the present invention shown in FIG. 2, a computer numerical control (CNC) 20 for controlling the amplifier 10 may be provided with the forcible decelerator 2, the DC link voltage monitor 3, the determination unit 4 and the torque command limiter 5.

Figure 3:
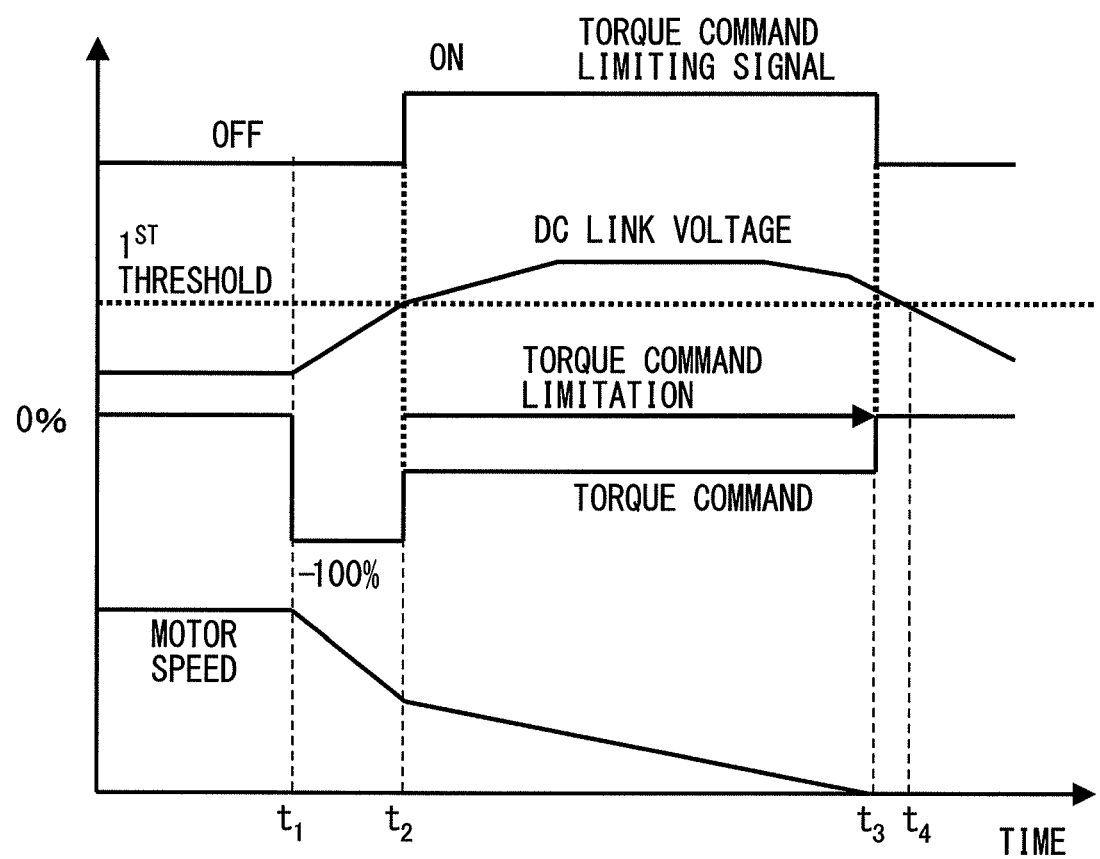
FIG. 3 is a timing chart of the motor speed, torque command, DC link voltage and torque command limiting signal in the motor control device according to the first embodiment of the present invention.

Next, description will be made on the motor control method by the motor control device according to the first embodiment of the present invention. FIG. 3 is a timing chart of the motor speed, torque command, DC link voltage and torque command limiting signal in the motor control device according to the first embodiment of the present invention.

As shown in FIG. 3, it is assumed that a power outage takes place at time $t_1$ until when the motor has operated at a predetermined motor speed. It is also assumed in this case that the DC link voltage gradually increases due to regenerative energy of the motor and reaches a first threshold at time $t_2$. Accordingly, since the value of DC link voltage is equal to or lower than the first threshold during the period from time $t_1$ to time $t_2$, the torque command given to the motor is not limited or a torque command of −100% is given. Superficially, in this period, the motor is decelerated by full torque.

When the value of DC link voltage reaches the first threshold at time $t_2$, the determination unit 4 determines that the value of DC link voltage has exceeded the first threshold at and after time $t_2$, and outputs a torque command limiting signal as the signal for limiting the torque command, to the torque command limiter 5. At this stage, the torque command limiting signal is in the ON state. The torque command limiter 5 limits the torque command based on the torque command limiting signal.

As shown in FIG. 3, since the value of DC link voltage after time $t_2$ has exceeded the first threshold, limitation on the torque command is continued. On the other hand, it is assumed that the motor gradually reduces its speed after time $t_1$ at which a power outage occurs, and stops at time $t_3$. In this case, even though the value of DC link voltage is above the first threshold, the torque command is set at 0% and the torque command limiting signal is also set to the OFF state.

As above, a limitation on the torque command is imposed from time $t_2$ to time $t_3$. Though the example shown in FIG. 3 illustrates a case where the motor stops at time $t_3$ after the value of DC link voltage once exceeds the first threshold and before the value comes down across the first threshold at time $t_4$, the present embodiment should not be limited to this. Specifically, if the value of DC link voltage comes down across the first threshold before time $t_3$ at which the motor stops, the limitation on the torque command is canceled and the motor is decelerated once again by full torque.

Next, the operation sequence of the motor control device according to the first embodiment of the present invention will be explained using a flow chart shown in FIG. 4. First, at Step S101 the power outage detector 1 determines whether or not a power outage of the power source 50 has occurred. When no power outage has been detected, the control returns to Step S101 and continues detection of a power outage.

When a power outage has been detected, the power outage detector 1 transmits a signal that indicates the occurrence of a power outage to the forcible decelerator 2, and at Step S102 the forcible decelerator 2 forcibly decelerates the motor for driving the feed shaft in accordance with the torque command.

Next, at Step S103 the determination unit 4 determines whether or not the value of DC link voltage detected by the DC link voltage monitor 3 is greater than the first threshold. When the determination unit 4 has determined that the value of DC link voltage is equal to or lower than the first threshold, it is determined at Step S105 whether or not the motor 40 has been stopped. The stoppage of the motor 40 can be determined by checking, for example, the measurement of the speed from an encoder (not shown) provided for the motor 40. When it is determined that the motor 40 is not stopped, the control goes back to Step S102, and forcible deceleration of the motor for driving the feed shaft is continued without limiting the torque command.

On the other hand, when, at Step S103, having determined that the value of DC link voltage detected by the DC link voltage monitor 3 is greater than the first threshold, the determination unit 4 outputs a signal for limiting the torque command. Further, at Step S104 the torque command limiter 5 limits the torque command to the predetermined torque command limiting value, in accordance with the result of determination at the determination unit 4. It is possible to clamp the torque command limiting value at a predetermined set value so that the lower limit of the torque command limiting value becomes equal to or greater than the torque applied when the motor is decelerated by dynamic breaking. Setting the lower limit of the torque command limiting value equal to or greater than the deceleration torque by dynamic breaking, makes it possible to shorten the time for deceleration compared to the case where dynamic braking is applied.

Next, at Step S105 it is determined whether or not the motor 40 has been stopped. If it is determined that the motor 40 has not been stopped, the control returns to Step S102 and continues forcible deceleration of the motor for driving the feed shaft, in accordance with the limited torque command. On the other hand, when it is determined at Step S105 that the motor 40 has been stopped, the operation of the motor control device is ended.

As has been described, according to the motor control device of the first embodiment of the present invention, limiting the deceleration torque applied to the motor for driving the feed shaft in accordance with the value of DC link voltage by monitoring the DC link voltage, enables such control as to stop the motor while reducing regenerative energy and avoiding overvoltage conditions.

Second Embodiment

Next, a motor control device according to a second embodiment of the present invention will be described. The configuration of the motor control device according to the second embodiment of the present invention is the same as that of the motor control device according to the first embodiment shown in FIG. 1. The motor control device according to the second embodiment is different from the motor control device according to the first embodiment in the following point. That is, in the motor control device according to the first embodiment, the determination unit 4 outputs a torque command limiting signal for limiting the torque command when the value of DC link voltage has been determined to exceed the first threshold. On the other hand, in the motor control device according to the second embodiment, the determination unit 4 outputs a torque command limiting signal for limiting the torque command when the change ratio of DC link voltage has been determined to exceed a second threshold. The other configurations of the motor control device according to the second embodiment are the same as those of the motor control device according to the first embodiment, and therefore a detailed description is omitted.

Figure 5:
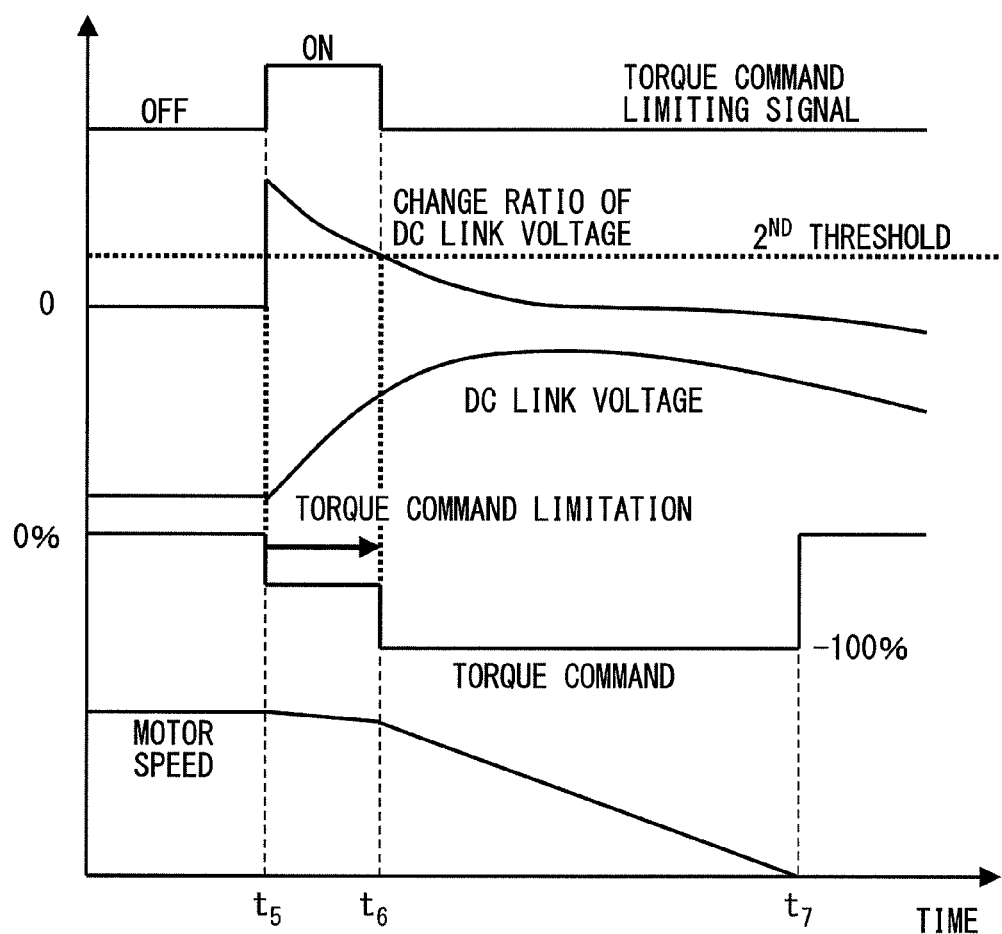
FIG. 5 is a timing chart of the motor speed, torque command, DC link voltage, change ratio of DC link voltage and torque command limiting signal in a motor control device according to a second embodiment of the present invention.

Next, the motor control method by the motor control device according to the second embodiment of the present invention will be described. FIG. 5 is a timing chart of the motor speed, the torque command, the DC link voltage, the change ratio of DC link voltage and the torque command limiting signal in the motor control device according to the second embodiment of the present invention.

As shown in FIG. 5, it is assumed that a power outage takes place at time $t_5$ until when the motor has operated at a predetermined motor speed. It is also assumed in this case that the DC link voltage increases due to regenerative energy of the motor and the change ratio of DC link voltage exceeds the second threshold at time $t_5$. Accordingly, the determination unit 4 determines that the change ratio of DC link voltage has exceeded the second threshold at time $t_5$ and outputs a torque command limiting signal for limiting the torque command (ON state), then the torque command limiter 5 limits the torque command to a predetermined torque command limiting value in accordance with the result of determination at determination unit 4.

It is assumed that the change ratio of DC link voltage gradually decreases at after time $t_5$ and becomes equal to the second threshold at time $t_6$. Accordingly, in the period from time $t_5$ to time $t_6$ the change ratio of DC link voltage is greater than the second threshold, so that the torque command given to the motor is limited during this period.

Then, as the change ratio of DC link voltage becomes equal to or lower than the second threshold at and after time $t_6$, the determination unit 4 determines that the change ratio of DC link voltage is equal to or lower than the second threshold and suspends the output of the torque command limiting signal that has been output to the torque command limiter 5 (OFF state). The torque command limiter 5, based on the suspension of the torque command limiting signal, cancels limitation on the torque command and validates the torque command of −100%. That is, the motor is decelerated by full torque in this period.

As shown in FIG. 5, the change ratio of DC link voltage after time $t_6$ is equal to or lower than the second threshold, so that the state of the torque command free from limitation is continued. On the other hand, it is assumed that the motor gradually reduces in speed after time $t_5$ at which a power outage occurs and stops at time $t_7$. In this case, even though the change ratio of DC link voltage is equal to or lower than the second threshold, the torque command is fixed to 0%.

As above, a limitation on the torque command is imposed from time $t_5$ to time $t_6$. Though the example shown in FIG. 5 illustrates a case where the motor stops after the change ratio of DC link voltage once exceeds the second threshold and comes down across the second threshold at time $t_6$, the present embodiment should not be limited to this. Specifically, if the change ratio of DC link voltage has not come down across the second threshold before time $t_7$ at which the motor stops, the motor is decelerated by the limited torque with the limitation on the torque command not released.

Figure 6:
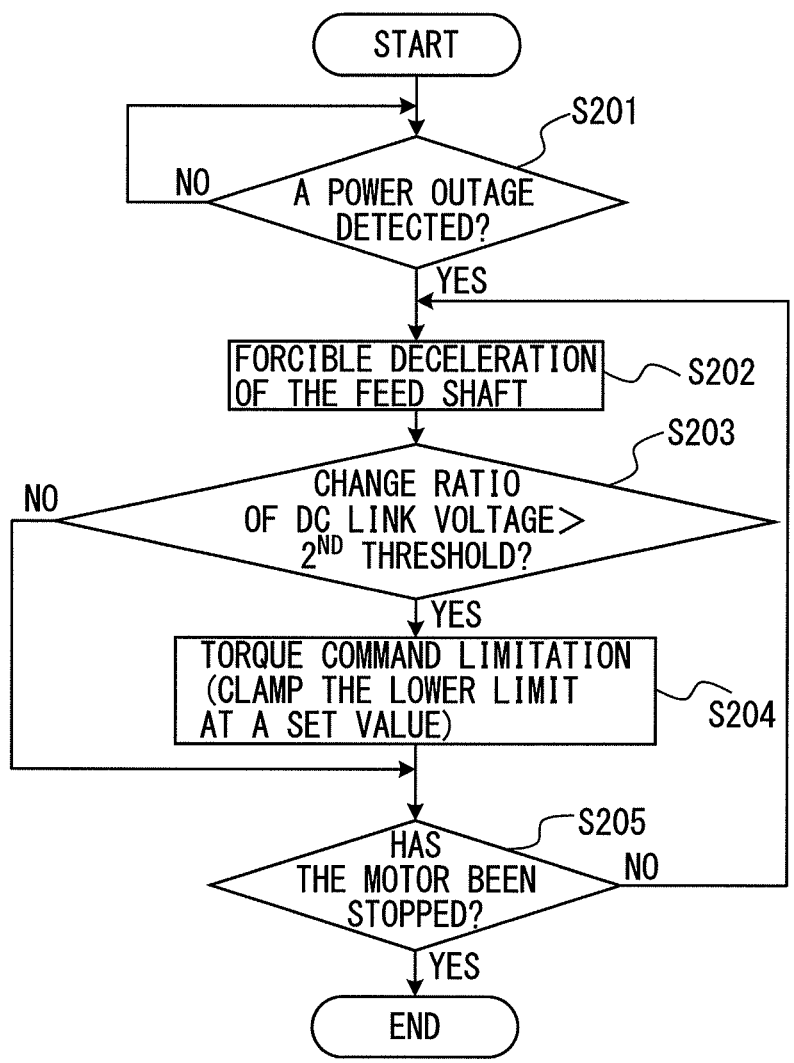
FIG. 6 is a flow chart for illustrating an operation sequence of the motor control device according to the second embodiment of the present invention.

Next, the operation sequence of the motor control device according to the second embodiment of the present invention will be explained using a flow chart shown in FIG. 6. At Step S201, the power outage detector 1 determines whether or not a power outage of the power source 50 has occurred. When no power outage has been detected, the control returns to Step S201 and continues detection of a power outage.

When a power outage has been detected, the power outage detector 1 transmits a signal that indicates occurrence of a power outage to the forcible decelerator 2, and at Step S202 the forcible decelerator 2 forcibly decelerates the motor for driving the feed shaft in accordance with the torque command.

Next, at Step S203 the determination unit 4 determines whether or not the change ratio of DC link voltage detected by the DC link voltage monitor 3 is greater than the second threshold. When the change ratio of DC link voltage is equal to or lower than the second threshold, it is determined at Step S205 whether or not the motor 40 has been stopped. The stoppage of the motor 40 can be determined by checking the measurement of the speed from an encoder (not shown) provided for the motor 40. When it is determined that the motor 40 is not stopped, the control goes back to Step S202, and forcible deceleration of the motor for driving the feed shaft is continued without limiting the torque command.

On the other hand, when, having determined, at Step S203, that the change ratio of DC link voltage detected by the DC link voltage monitor 3 is greater than the second threshold, the determination unit 4 outputs a signal for limiting the torque command. Further, at Step S204 the torque command limiter 5 controls the torque command to a predetermined torque command limiting value, in accordance with the result of determination at the determination unit 4. Here, it is possible to clamp the torque command limiting value at a predetermined set value so that the lower limit of the torque command limiting value is equal to or greater than the torque applied when the motor is decelerated by dynamic breaking. Setting the lower limit of the torque command limiting value equal to or greater than the deceleration torque by dynamic breaking, makes it possible to shorten the time for deceleration compared to the case where dynamic braking is applied.

Next, at Step S205 it is determined whether or not the motor 40 has been stopped. If it is determined that the motor 40 has not been stopped, the control returns to Step S202 and continues forcible deceleration of the motor for driving the feed shaft, in accordance with the limited torque command. On the other hand, when it is determined at Step S205 that the motor 40 has been stopped, the operation of the motor control device is ended.

As has been described, according to the motor control device of the second embodiment of the present invention, limiting the deceleration torque applied to the motor for driving the feed shaft in accordance with the change ratio of DC link voltage by monitoring the DC link voltage, enables such control as to stop the motor while reducing regenerative energy and avoiding overvoltage conditions.

Third Embodiment

Next, a motor control device according to a third embodiment of the present invention will be described. The configuration of the motor control device according to the third embodiment of the present invention is the same as that of the motor control device according to the first embodiment shown in FIG. 1. The motor control device according to the third embodiment is different from the motor control device according to the first embodiment in the following point. That is, in the motor control device according to the first embodiment, the determination unit 4 outputs a torque command limiting signal for limiting the torque command when the value of DC link voltage has been determined to exceed the first threshold. On the other hand, in the motor control device according to the third embodiment, the determination unit 4 stores a plurality of torque command limiting values and selects one of the plural torque command limiting values, in accordance with the value of DC link voltage. The other configurations of the motor control device according to the third embodiment are the same as those of the motor control device according to the first embodiment, and therefore a detailed description has been omitted.

Figure 7:
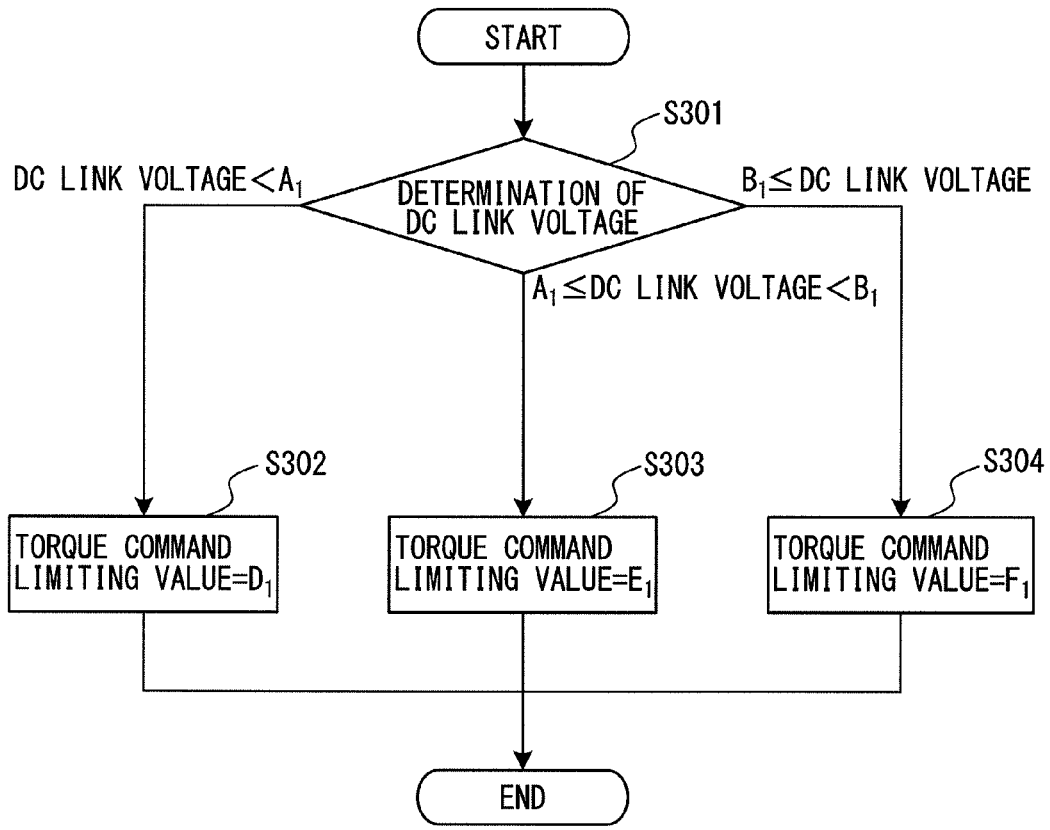
FIG. 7 is a flow chart for illustrating an operation sequence of a motor control device according to a third embodiment of the present invention.

FIG. 7 is a flow chart for illustrating an operation sequence of the motor control device according to the third embodiment of the present invention. In FIG. 7, the determination procedure of DC link voltage in determination unit 4 alone is shown. That is, Steps S301 to S304 in FIG. 7 correspond to Steps S103 and S104 in the flow chart for illustrating an operation sequence of the motor control device according to the first embodiment shown in FIG. 4, and the steps corresponding to Steps S101, S102 and S105 are implemented similarly in the motor control device according to the third embodiment.

The determination unit 4 in the motor control device according to the third embodiment stores a plurality of torque command limiting values and may include a storage unit (not shown) for storing them. It is assumed herein as one example that three torque command limiting values $D_1$, $E_1$ and $F_1$ are stored. The torque command limiting values $D_1$, $E_1$ and $F_1$ take a value of 0 to 100%. As described above, the motor control device according to the third embodiment, similarly to the motor control device of the first embodiment, executes the operation corresponding to Steps S101 and S102 in the flow chart in FIG. 4. Then, at Step S301 it is determined whether the value of DC link voltage is less than a predetermined value '$A_1$', equal to or greater than '$A_1$' and less than '$B_1$', or equal to or greater than a predetermined value '$B_1$'.

When the determination unit 4 has determined at Step S301 that the value of DC link voltage is less than the predetermined value '$A_1$', the torque command limiting value is set at '$D_1$' at Step S302. On the other hand, when the determination unit 4 has determined at Step S301 that the value of DC link voltage is equal to or greater than '$A_1$' and less than '$B_1$', the torque command limiting value is set at '$E_1$' at Step S303. Further, when the determination unit 4 has determined at Step S301 that the value of DC link voltage is equal to or greater than '$B_1$', the torque command limiting value is set at '$F_1$' at Step S304. Thereafter, the torque command for the motor is limited based on the set torque command limiting value to effect deceleration of the motor.

In this way, the determination unit 4 stores multiple torque command limiting values and selects one from the multiple torque command limiting values in accordance with the value of DC link voltage, whereby it is possible to set an appropriate torque command limiting value in accordance with the value of DC link voltage.

Though the above description of the motor control device according to third embodiment gives an example where three kinds of values are prepared for the torque command limiting value so that the torque command limiting value can be selected from the three in accordance with the value of DC link voltage, the number of the values is not limited to this. Two or four or more values may be prepared to be selected.

Fourth Embodiment

Next, a motor control device according to a fourth embodiment of the present invention will be described. The configuration of the motor control device according to the fourth embodiment of the present invention is the same as that of the motor control device according to the first embodiment shown in FIG. 1. The motor control device according to the fourth embodiment is different from the motor control device according to the first embodiment in the following point. That is, in the motor control device according to the first embodiment, the determination unit 4 outputs a signal for limiting the torque command when the value of DC link voltage has been determined to exceed the first threshold. On the other hand, in the motor control device according to the fourth embodiment, the determination unit 4 continuously changes the torque command limiting value in accordance with the difference of the value of DC link voltage from a first threshold. The other configurations of the motor control device according to the fourth embodiment are the same as those of the motor control device according to the first embodiment, and therefore a detailed description is omitted.

Figure 8:
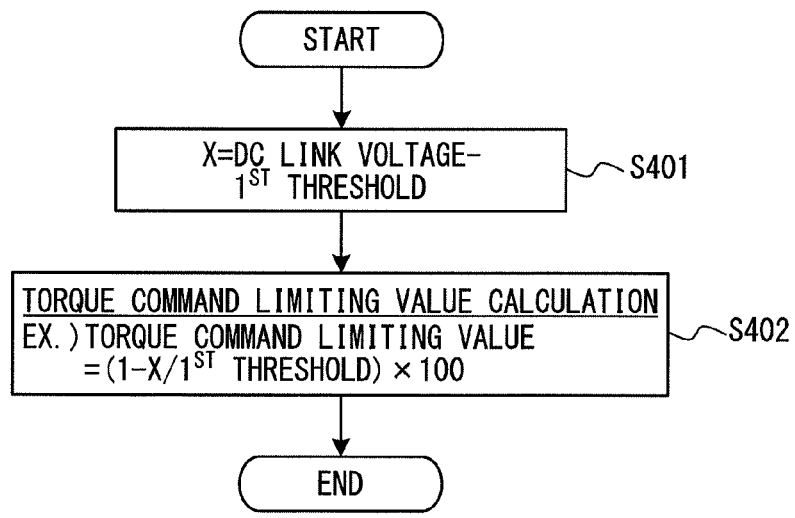
FIG. 8 is a flow chart for illustrating an operation sequence of a motor control device according to a fourth embodiment of the present invention.

FIG. 8 is a flow chart for illustrating an operation sequence of the motor control device according to the fourth embodiment of the present invention. In FIG. 8, the calculation procedure of a torque command limiting value based on the value of DC link voltage in determination unit 4 alone is shown. That is, Steps S401 and S402 in FIG. 8 correspond to Steps S103 and S104 in the flow chart for illustrating the operation sequence of the motor control device according to the first embodiment shown in FIG. 4, and the steps corresponding to Steps S101, S102 and S105 are also implemented similarly in the motor control device according to the fourth embodiment.

Figure 4:
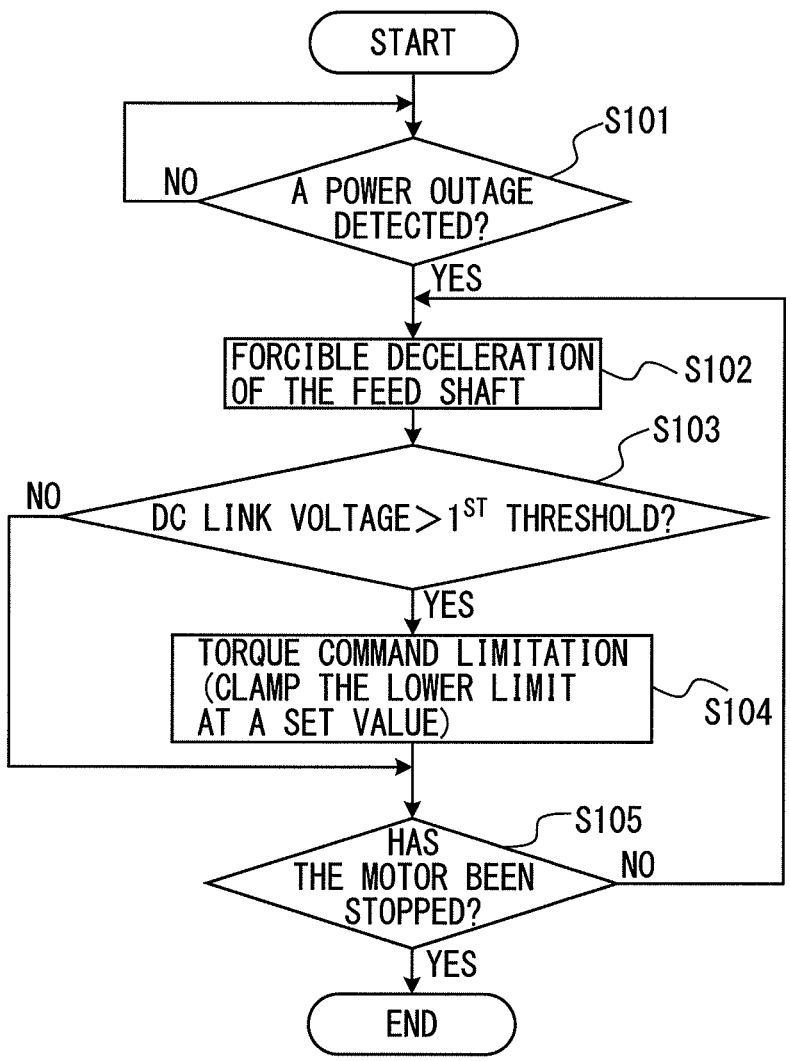
FIG. 4 is a flow chart for illustrating an operation sequence of the motor control device according to the first embodiment of the present invention.

As described above, the motor control device according to the fourth embodiment performs the operation corresponding to Steps S101 and S102 shown in FIG. 4, similarly to the motor control device of the first embodiment. Then, at Step S401, 'X' a difference of the value of DC link voltage from the first threshold is calculated by a calculation formula (X=DC link voltage value−the first threshold). Description herein is to explain the procedure for calculating a torque command limiting value based on the value of DC link voltage, so that it is presumed that the value of DC link voltage is greater than the first threshold. In other words, 'X' or the difference of the value of DC link voltage from the first threshold is assumed to be equal to or greater than 0.

Next, at Step S402, the torque command limiting value is continuously varied in accordance with the value of difference 'X' of the value of DC link voltage from the first threshold. For example, the torque command limiting value [%] is calculated by the following formula (1):

$$\text{Torque command limiting value}=(1-X/\text{the first threshold})\times 100 \quad (1).$$

Herein, when the value of DC link voltage is equal to or greater than twice the first threshold, the torque command limiting value is set at 0[%].

The above-described Steps S401 and S402 may be effected every time the value of DC link voltage varies, to thereby change the torque command limiting value every time the value of DC link voltage varies.

In the above way, the determination unit 4 can continuously change the torque command limiting value in accordance with the difference of the value of DC link voltage from the first threshold to thereby finely set the torque command limiting value in accordance with the value of DC link voltage.

In the description of the motor control device according to the fourth embodiment, though the torque command limiting value is calculated in accordance with the above formula (1), the method of calculation is not limited to this. It is possible to calculate the torque command limiting value by use of formulas other than the above formula (1).

Fifth Embodiment

Next, a motor control device according to a fifth embodiment of the present invention will be described. The configuration of the motor control device according to the fifth embodiment of the present invention is the same as that of the motor control device according to the first embodiment shown in FIG. 1. The motor control device according to the fifth embodiment is different from the motor control device according to the first embodiment in the following point. That is, in the motor control device according to the first embodiment, the determination unit 4 outputs a signal for limiting the torque command when the value of DC link voltage has been determined to exceed the first threshold. On the other hand, in the motor control device according to the fifth embodiment, the determination unit 4 stores a plurality of torque command limiting values and selects one of the plural torque command limiting values, in accordance with the change ratio of DC link voltage. The other configurations of the motor control device according to the fifth embodiment are the same as those of the motor control device according to the first embodiment, and therefore a detailed description is omitted.

FIG. 9 is a flow chart for illustrating an operation sequence of the motor control device according to the fifth embodiment of the present invention. In FIG. 9, the setting procedure of a torque command limiting value based on the change ratio of DC link voltage in determination unit 4 alone is shown. That is, Steps S501 to S504 in FIG. 9 correspond to Steps S103 and S104 in the flow chart for illustrating the operation sequence of the motor control device according to the first embodiment shown in FIG. 4, and the steps corresponding to Steps S101, S102 and S105 are also implemented similarly in the motor control device according to the fifth embodiment.

The determination unit 4 in the motor control device according to the fifth embodiment stores a plurality of torque command limiting values and may include a storage unit (not shown) for storing them. It is assumed herein as one example that three torque command limiting values $D_2$, $E_2$ and $F_2$ are stored. The torque command limiting values $D_2$, $E_2$ and $F_2$ take a value of 0 to 100%. As described above, the motor control device according to the fifth embodiment, similarly to the motor control device of the first embodiment, executes the operation corresponding to Steps S101 and S102 in the flow chart in FIG. 4. Then, at Step S501 it is determined whether $\Delta V_{DC}$, the change ratio of DC link voltage, is less than a predetermined value '$A_2$', equal to or greater than '$A_2$' and less than '$B_2$', or equal to or greater than a predetermined value '$B_2$'.

When the determination unit 4 has determined at Step S501 that $\Delta V_{DC}$, the change ratio of DC link voltage is less than the predetermined value '$A_2$', the torque command limiting value is set at '$D_2$' at Step S502. On the other hand, when the determination unit 4 has determined at Step S501 that $\Delta V_{DC}$, the change ratio of DC link voltage is equal to or greater than '$A_2$' and less than '$B_2$', the torque command limiting value is set at '$E_2$' at Step S503. Further, when the determination unit 4 has determined at Step S501 that $\Delta V_{DC}$, the change ratio of DC link voltage is equal to or greater than '$B_2$', the torque command limiting value is set at '$F_2$' at Step S504. Then, the torque command for the motor is limited based on the set torque command limiting value to effect deceleration of the motor.

In this way, the determination unit 4 stores multiple torque command limiting values and selects one from the multiple torque command limiting values in accordance with the change ratio of DC link voltage, whereby it is possible to set an appropriate torque command limiting value in accordance with the change ratio of DC link voltage.

Though the above description of the motor control device according to fifth embodiment gives an example where three kinds of values are prepared for the torque command limiting value so that the torque command limiting value can be selected from the three in accordance with the change ratio of DC link voltage, the number of the values is not limited to this. Two or four or more values may be prepared to be selected.

Sixth Embodiment

Next, a motor control device according to a sixth embodiment of the present invention will be described. The configuration of the motor control device according to the sixth embodiment of the present invention is the same as that of the motor control device according to the first embodiment shown in FIG. 1. The motor control device according to the sixth embodiment is different from the motor control device according to the first embodiment in the following point. That is, in the motor control device according to the first embodiment, the determination unit 4 outputs a torque command signal for limiting the torque command when the value of DC link voltage has been determined to exceed the first threshold. On the other hand, in the motor control device according to the sixth embodiment, the determination unit 4 continuously changes the torque command limiting value in accordance with the difference of the change ratio of DC link voltage from a second threshold. The other configurations of the motor control device according to the sixth embodiment are the same as those of the motor control device according to the first embodiment, and therefore a detailed description is omitted.

FIG. 10 is a flow chart for illustrating an operation sequence of the motor control device according to the sixth embodiment of the present invention. In FIG. 10, the calculation procedure of the torque command limiting value based on the change ratio of DC link voltage in determination unit 4 alone is shown. That is, Steps S601 and S602 in FIG. 10 correspond to Steps S103 and S104 in the flow chart for illustrating the operation sequence of the motor control device according to the first embodiment shown in FIG. 4, and the steps corresponding to Steps S101, S102 and S105 are also implemented similarly in the motor control device according to the sixth embodiment.

As described above, the motor control device according to the sixth embodiment performs the operation corresponding to Steps S101 and S102 shown in FIG. 4, similarly to the motor control device of the first embodiment. Then, at Step S601, 'Y' a difference of the change ratio of DC link voltage from the second threshold is calculated by a calculation formula (Y=the change ratio of DC link voltage value−the second threshold). The description herein is to explain the procedure for limiting the torque command, so that it is presumed that the change ratio of DC link voltage is greater than the second threshold. In other words, the difference 'Y' of the change ratio of DC link voltage from the second threshold is assumed to be equal to or greater than 0.

Next, at Step S602, the torque command limiting value is continuously varied in accordance with the value of difference 'Y' of the change ratio of DC link voltage from the second threshold. For example, the torque command limiting value [%] is calculated by the following formula (2):

Torque Command Limiting Value=(1−Y/the second threshold)×100   (2).

Herein, when the change ratio of DC link voltage is equal to or greater than twice the second threshold, the torque command limiting value is set at 0[%].

The above-described Steps S601 and S602 may be effected every time the change ratio of DC link voltage varies, to thereby change the torque command limiting value every time the change ratio of DC link voltage varies.

In the above way, the determination unit 4 can continuously change the torque command limiting value in accordance with the difference of the change ratio of DC link voltage from the second threshold to thereby finely set the torque command limiting value in accordance with the change ratio of DC link voltage.

In the description of the motor control device according to the sixth embodiment, though the torque command limiting value is calculated in accordance with the above formula (2), the method of calculation is not limited to this. It is possible to calculate the torque command limiting value by use of formulas other than the above formula (2).

Seventh Embodiment

Next, a motor control device according to a seventh embodiment of the present invention will be described. FIG. 11 is a configurational diagram showing a motor control device according to the seventh embodiment of the present invention. A motor control device 102 according to the seventh embodiment is different from the motor control device 101 according to the first embodiment in that the motor control device 102 controls both the motor 40 for driving the feed shaft and a motor 41 for driving the main shaft provided for the machine tool, and further includes a forcible accelerator 12 for giving a command of acceleration to the motor 41 for driving the main shaft. The other configurations of the motor control device 102 according to the seventh embodiment are the same as those of the motor control device 101 according to the first embodiment, and therefore a detailed description has been omitted.

In the motor control device according to the seventh embodiment, in order to avoid an increase of regenerative energy at the time of a power outage, the motor 41 for driving the main shaft is accelerated to consume energy as soon as a power outage has occurred. Application of the present invention to the motor control device in this way makes it possible to suppress increase in DC link voltage even when there is a risk of increase in DC link voltage and generation of an overvoltage alarm due to insufficient acceleration energy of the motor for driving the main shaft.

According to the motor control device of the embodiments of the present invention, it is possible to stop the motor for driving the feed shaft quickly while avoiding an overvoltage alarm after occurrence of a power outage.

What is claimed is:
1. A motor control device for a motor for driving a feed shaft of a machine tool, comprising:
a power outage detector configured to detect a power outage of a power source for supplying power to drive the motor;
a forcible decelerator configured to forcibly decelerate the motor in response to a torque command at the time when a power outage is detected;
a DC link voltage monitor configured to monitor a DC link voltage applied to an amplifier for driving the motor;
a determination unit configured to determine whether or not the value of the DC link voltage is greater than a first threshold, or whether or not the change ratio of the DC link voltage is greater than a second threshold; and,
a torque command limiter configured to limit the torque command to a predetermined torque command limiting value, in accordance with the result of determination at the determination unit,
wherein the determination unit outputs a signal for limiting the torque command when the value of the DC link voltage is determined to exceed the first threshold.

2. The motor control device according to claim 1,
wherein the determination unit stores a plurality of torque command limiting values and selects one from the plural torque command limiting values in accordance with the value of the DC link voltage.

3. The motor control device according to claim 1,
wherein the determination unit continuously varies the torque command limiting value in accordance with the difference of the value of the DC link voltage from the first threshold.

4. The motor control device according to claim 1,
wherein the determination unit stores a plurality of torque command limiting values and selects one from the plural torque command limiting values in accordance with the change ratio of the DC link voltage.

5. The motor control device according to claim 1,
wherein the lower limit of the torque command limiting value is equal to or greater than the torque applied when the motor is decelerated by dynamic braking.

6. The motor control device according to claim 1, further comprising:
a forcible accelerator configured to control both the motor for driving the feed shaft and a motor for driving the main shaft provided for the machine tool and give a command of acceleration to the motor for driving the main shaft when a power outage is detected.

7. A motor control device for a motor for driving a feed shaft of a machine tool, comprising:
a power outage detector configured to detect a power outage of a power source for supplying power to drive the motor;
a forcible decelerator configured to forcibly decelerate the motor in response to a torque command at the time when a power outage is detected;
a DC link voltage monitor configured to monitor a DC link voltage applied to an amplifier for driving the motor;
a determination unit configured to determine whether or not the value of the DC link voltage is greater than a first threshold, or whether or not the change ratio of the DC link voltage is greater than a second threshold; and,
a torque command limiter configured to limit the torque command to a predetermined torque command limiting value, in accordance with the result of determination at the determination unit,
wherein the determination unit outputs a signal for limiting the torque command when the change ratio of the DC link voltage is determined to exceed the second threshold.

8. The motor control device according to claim 7,
wherein the determination unit continuously varies the torque command limiting value in accordance with the difference of the change ratio of the DC link voltage from the second threshold.

* * * * *